United States Patent Office 3,749,707
Patented July 31, 1973

3,749,707
PREPARATION OF NEW PROTEIN DERIVATIVES BY REACTING GELATIN WITH AROMATIC COMPOUNDS CONTAINING STILBENE OR DIPHENYLIMIDAZOLONE GROUPS
Marcel Nicolas Vrancken, Hove, and Jozef Frans Willems, Wilrijk-Antwerp, Belgium, assignors to Gevaert Photo-Producten N.V., Mortsel, Belgium
No Drawing. Continuation of application Ser. No. 576,567, Sept. 1, 1966, which is a continuation-in-part of application Ser. No. 175,818, Feb. 26, 1962, both now abandoned. This application Mar. 9, 1971, Ser. No. 122,530
Claims priority, application Netherlands, Feb. 27, 1961, 261,706
Int. Cl. C07g 7/00; C08h 1/06; G03c 1/92
U.S. Cl. 260—117  1 Claim

ABSTRACT OF THE DISCLOSURE

A protein such as gelatin, casein or wool is chemically reacted at a pH between 7 and 11 with an organic aromatic fluorescent compound of the type containing a stilbene or diphenylimidazolone group and bearing a group which is chemically reactive with said protein, such as an active halogen atom, anhydride group or the like, the fluorescent compound being present in an amount equal to 20–120% by weight of the protein. The fluorescent compound is preferably dissolved in a solvent inert with respect to it and the protein at a concentration of 2–23%. The protein can be treated in the form of a solid or water solution, and in the latter case is recovered by reducing the pH of the solution. A preferred utility for the resultant reaction product is in the formation of layers in photographic material.

---

This application is a continuation of application Ser. No. 576,567, Sept. 1, 1966, which is a continuation-in-part of application Ser. No. 175,818, Feb. 26, 1962, both now abandoned.

This invention relates to the preparation of derivatives of proteins and their application for photographic purposes.

It is known to react proteins, such as gelatin in particular, with all kinds of compounds so as to prepare derivatives showing special properties in one characteristic or another.

It has now been found that specially interesting derivatives of proteins can be obtained by causing such protein to react with a fluorescent compound bearing one or more groups which are chemically reactive therewith.

This reaction may proceed either in an aqueous solution, in a medium which consists partially of organic solvents, in organic solvents or in a mixture of organic solvents and water, provided, of course, the solution or medium is inert with respect to the protein and to the fluorescent compound selected. The fluorescent may either be dissolved or suspended in the solution or medium dependent upon the mutual solubilities thereof and should be present in an amount ranging from about 20–120% by weight of the protein with which it is to be reacted.

The protein to be treated may either be treated in solid form, which may be its native form in the case of natural proteins, or in the form of an aqueous solution where the protein selected has suitable solubility characteristics. Virtually any protein, whether natural or synthetic, is adapted for treatment in accordance with the invention, so far as can be determined, the only apparent requirement being the purely practical one that the protein be already fibrous or film form or be adapted to be recovered from the treatment solution in such a form. Preferably, especially where a water-soluble protein is to be treated in the form of a water-solution, such solution is maintained at a pH in the region of pH 7–11. Thus, the protein is readily recoverable by lowering the pH of the reaction medium until the protein derivative precipitates.

A more preferred condition for the latter case is to allow the reaction to proceed at pH 9–11.

In the case of gelatin, the reaction is preferably carried out at a temperature between 20° and 60° C. and in a medium at pH 7–11, preferably at pH 9–11.

By reactive groups to be present on the fluorescent compound, are especially understood carboxylic acid halide groups, sulfonic acid halide groups and reactive groups carrying halogen atoms in general. Anhydride groups, epoxide groups or isocyanate groups are, however, also considered. By reaction of these groups with the protein, the fluorescent compound is chemically bound to the protein molecule.

Examples of fluorescent compounds bearing reactive groups which are suited for reaction with proteins are:
4-phenyl-5-p-chlorosulfonyl phenyl-2-imidazolone

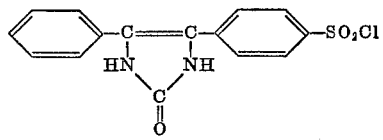

2,2'-disulfo-4,4'-bis(2,4-dichloro - s - triazine-6-yl-amino)-stilbene

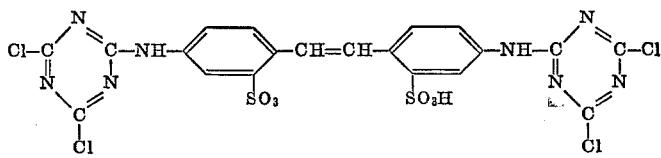

2-sulfo-4-(2,4-dichloro-s-triazine-6-yl-amino)-stilbene

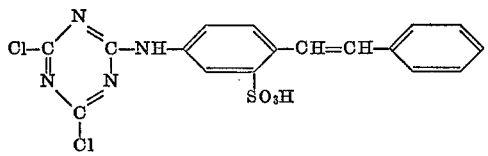

p-Chlorocarbonyl-stilbene

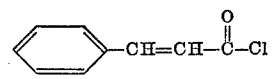

As can be seen from these examples, virtually any fluorescent compound bearing an aromatic ring structure is effective for present purposes, provided the necessary reactive group is present.

As exemplary proteins which are suited for reaction according to the invention, mention may be made of gelatin and casein especially, but also leather and wool.

If for instance wool or leather are immersed for some time in an alkaline solution at 20–60° C. and containing a fluorescent substance as defined above, a part of the fluorescent substance is taken up by the treated material and chemically bound to it, so that it cannot be washed away.

It is possible to improve considerably the white appearance of all kinds of surfaces by applying to these surfaces a coating which consists of or includes a fluorescent protein derivative according to the invention or by reacting the fluorescent compounds with the material of a proteinaceous surface. The resulting increase of the reflecting power is caused by the fact that the fluorescent compounds absorb ultraviolet radiations and re-radiate these under the form of a visible light. If this visible light is bluish, a neutralization of the yellow tones of the surface is obtained whereby its white appearance is considerably enhanced.

Layers which are partially or wholly composed of e.g. a gelatin derivative with a fluorescent compound as defined above, show a strong fluorescence which is kept even after long rinsing. This is of special interest with regard to the manufacture of photographic materials wherein gelatin is normally used as a binding agent. The gelatin derivatives show practically the same properties as common gelatin but they show moreover a strong fluorescence. Since the common properties of the gelatin are kept, such gelatin derivatives can easily be worked up in photographic layers and the fluorescent substance will not be washed out e.g. when treating in photographic baths.

When an optical bleaching agent was according to former practice added to the photographic paper itself and/or to the baryta-coated layer and/or to the emulsion layer applied thereon, the ultimate brightening was dependent on the amount of optical bleaching agent which was still present in the completely finished paper after treatment in the different baths. If, however, a protein derivative according to the invention is added to the baryta layer, to an interlayer of to the light-sensitive emulsion, the ultimate brightening of the material is then completely stable and cannot be modified anymore by washing or other treatments.

Since the new protein derivatives absorb ultraviolet light, it is also possible to use these substances alone or together with other binding agents e.g. in filter layers of photographic or other materials.

The following examples illustrate the invention.

EXAMPLE 1

400 cm.$^3$ of a 10% aqueous gelatin solution is heated at 40° C. and brought at pH 10 with sodium hydroxide.

To this solution 15 g. of 4-phenyl-5-p-chlorosulfonyl phenyl-2-imidazolone dissolved in 100 cm.$^3$ of dimethylformamide are added in about 15 min. whilst strongly stirring. The pH is kept at 10 with sodium hydroxide. Thereupon the solution is kept for still 30 min. at 45° C. and at pH 10. The solution is then acidified to pH 7 with 2 N hydrochloric acid, then solidified by cooling and noodled. The noodles are washed for about 16 h. in running water and dried.

The obtained gelatin derivatives comprises, according to the Van Slijke's amino determination, only 0.01% amino nitrogen whereas for the unmodified gelatin 0.55% is found.

Layers coated from this gelatin derivative show a strong fluorescence which does not disappear, even after long rinsing in cold water.

Layers consisting of a mixture of common gelatin and the gelatin derivative or layers consisting of a mixture of the gelatin derivative and another hydrophilic polymer such as polyvinyl pyrrolidone also show a strong fluorescence.

On the contrary, gelatin layers coated from a solution to which the fluorescent compound has ben added in the form of the corresponding free sulfonic acid lose their fluorescence after rinsing.

EXAMPLE 2

To 250 cm.$^3$ of a 10% aqueous solution of casein at pH 10 and 45° C., 15 g. of 4-phenyl-5-p-chlorosulfonyl phenyl-2-imidazolone suspended in 200 cm.$^3$ of ethanol are added in about 30 min. The pH of the solution is kept at 10 with sodium hydroxide.

After complete adding, the solution is allowed to stand for 1 h. at 45° C. Thereupon the solution is cooled and acidified to pH 5 with 2 N sulfuric acid whereby the casein derivative flocculates. The derivative is separated and washed in running water for 10 h.

The obtained casein derivative shows a strong fluorescence. An amino titration according to Sörensen shows that no free amino groups are present anymore.

EXAMPLE 3

To 10 l. of a 5% aqueous gelatin solution at 45° C. and at pH 10, are added 150 g. of the disodium salt of 2,2' - disulfo - 4,4'-bis(2,4-dichloro-s-triazine-6-yl-amino)-stilbene, suspended in 1 l. of dimethyl formamide.

The reaction mixture is kept for 5 h. at pH 10 and 45° C. Thereupon the solution is cooled till about 25° C. and acidified with sulfuric acid to pH 5. By adding a concentrated aqueous solution of sodium sulfate, the gelatin derivative is flocculated whereupon it is washed for 10 h. in cold water.

Layers coated from this gelatin derivative which is prepared according to this method, show a strong fluorescence and become water-insoluble after storing for some time.

EXAMPLE 4

To 200 cm.$^3$ of a 10% aqueous casein solution at 45° C. and pH 10, 20 g. of the disodium of 2-sulfo-4-[2,4-dichloro-s-triazine-6-yl-amino]-stilbene, suspended in 100 cm.$^3$ of ethanol, are added in about 15 min.

The pH of the solution is kept at pH 10 with sodium hydroxide.

After complete adding, the mixture is allowed to react for still 30 minutes whereupon the solution is acidified to pH 7 with 2 N sulfuric acid.

The flocculated casein derivative is then washed for 10 h. in running water and dried.

The obtained casein derivative shows a strong fluorescence.

EXAMPLE 5

200 cm.$^3$ of a 10% aqueous gelatin solution at 45° C. are brought at pH 10 with sodium hydroxide. Thereupon 10 g. of p-chlorocarbonyl stilbene dissolved in 300 cm.$^3$ of dimethyl formamide are added in about 30 min.

After complete adding, the solution is kept for about 1 h. at 45° C. Thereupon the solution is cooled till 25° C., acidified to pH 7 with sulfuric acid and poured into an excess of acetone whereby the gelatin derivative flocculates. The flocculated gelatin derivative is dispersed in hot water to which dimethyl formamide is then added until the solution becomes clear. This solution is poured anew in an excess of acetone and the thus purified flocculated gelatin derivative is redispersed in hot water, solidified, noodled and dried.

The gelatin derivative shows a strong fluorescence.

EXAMPLE 6

150 cm.$^3$ of a 10% aqueous gelatin solution at 45° C. are brought at pH 10 with N sodium hydroxide. Thereupon 6.5 g. of 2-sulfo - 4 - (2,4-dichloro-s-triazine-6-yl-amino)-stilbene suspended in 30 cm.$^3$ of dimethyl formamide are added. This solution is kept for 1 h. at pH 10 by adding N sodium hydroxide. Then the pH of the solution rises to pH 8 whereupon the solution is solidified by cooling, noodled, washed and dried.

The obtained gelatin derivative shows a strong fluorescence. An amino titration according to Sörensen shows that practically no free amino groups are present anymore.

EXAMPLE 7

2 g. of 2,2'-disulfo - 4,4' - bis(2,4-dichloro-s-triazine-6-yl-amino)-stilbene are dissolved in a mixture of 140 cm.$^3$ of acetone, 10 cm.$^3$ of dimethyl formamide and 4 cm.$^3$ of a 35% solution of trimethylbenzyl ammonium hydroxide in ethanol.

About 3 g. of crude wool fibres are immersed overnight in this solution at room temperature and then washed first in acetone, then for 30 min. in water at pH 10 and finally in running water for 6 h.

The thus treated wool fibres show a strong fluorescence.

EXAMPLE 8

The gelatin derivative obtained according to any of Examples 1, 3, 5 and 6 is substituted for the amount of gelatin binding agent usually employed in a baryta-coating composition and the modified composition is coated on an ordinary photographic support and followed by a coating of a conventional light-sensitive gelatin silver halide emulsion, all in the usual manner of the art. The resultant material, after exposure and photographic development by the standard procedure, exhibits improved fluorescence which is not lost even after repeated washing.

We claim:

1. A process for the preparation of a derivative of gelatin which comprises treating said gelatin at a temperature of about 20–60° C. with an aqueous alkaline solution having a pH of about 9–11 and containing 2–23% of an organic aromatic fluorescent compound having the general formula:

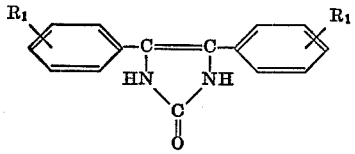

wherein one $R_1$ is hydrogen and the other $R_1$ is a chlorosulfonyl group, said fluorescent compound being present in an amount of 20–120% by weight of said gelatin, whereby said chlorosulfonyl group reacts by chemical condensation with said gelatin to produce a stable chemical substitution product, and recovering said substitution product from said treatment solution.

References Cited

UNITED STATES PATENTS

| | | | |
|---|---|---|---|
| 2,232,892 | 2/1941 | Von Klenck | 8—1 |
| 2,494,041 | 5/1942 | Russell et al. | 260—117 |
| 2,526,668 | 10/1950 | Keller et al. | 260—249.5 |
| 2,723,197 | 11/1955 | Libby et al. | 96—82 X |
| 3,181,950 | 5/1965 | Koerber et al. | 96—82 |

FOREIGN PATENTS

| | | | |
|---|---|---|---|
| 573,462 | 4/1959 | Canada | 96—82 |
| 1,029,731 | 5/1966 | Great Britain | 260—117 |

OTHER REFERENCES

Chem. Abstracts, vol. 57, 1962, 16042g–h, Belgian Pat. 614,426, Gevaert.

HOWARD E. SCHAIN, Primary Examiner

U.S. Cl. X.R.

96—82; 260—112 R, 119, 123.7